No. 714,102. Patented Nov. 18, 1902.
ST. JOHN DAY.
CLOTHES LINE PROP.
(Application filed Jan. 13, 1902.)
(No Model.)
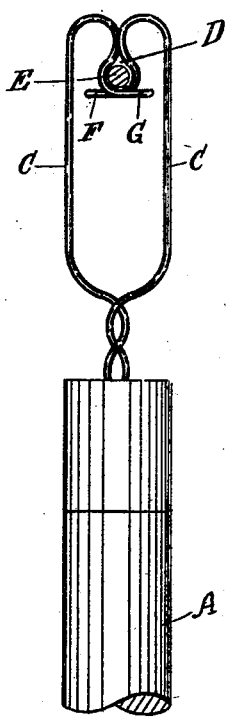
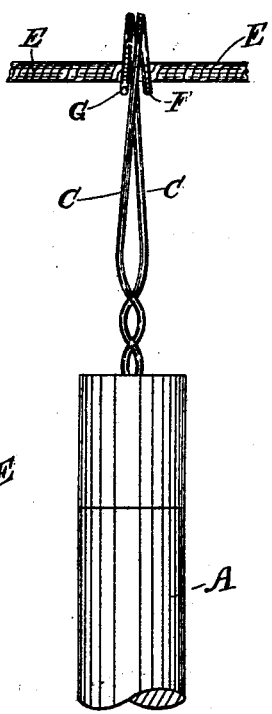
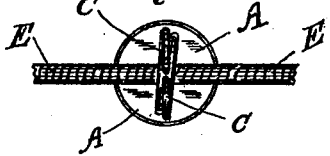
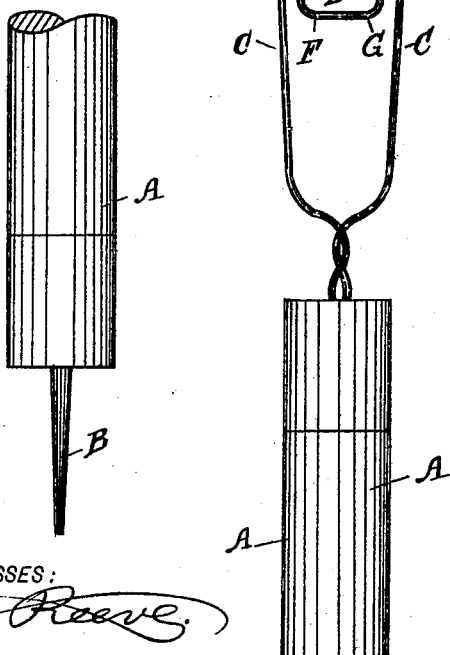
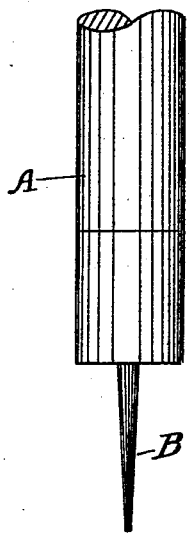
WITNESSES: INVENTOR

UNITED STATES PATENT OFFICE.

ST. JOHN DAY, OF LOS ANGELES, CALIFORNIA, ASSIGNOR TO VICTORIA V. HOPKINS, OF SAN BERNARDINO, CALIFORNIA.

CLOTHES-LINE PROP.

SPECIFICATION forming part of Letters Patent No. 714,102, dated November 18, 1902.

Application filed January 13, 1902. Serial No. 89,614. (No model.)

*To all whom it may concern:*

Be it known that I, ST. JOHN DAY, of the city of Los Angeles, in the county of Los Angeles, in the State of California, have invented a Clothes-Line Prop, of which the following is a full, clear, and exact description or specification, reference being had to the annexed sheets of drawings and to the letters marked thereon.

My invention, which relates to certain new and useful improvements in poles or posts for stretching and propping lines or ropes upon which clothes are hung to be dried and which may also be used for analogous purposes, has for its object to enable poles or posts to become attached to the line or rope when in use and to be readily detached therefrom when not in use by simply either pushing or pulling such post, so that the upper end thereof opens to receive the line or rope and at the same time incloses the line or rope within an opening contained between two pieces of stout wire, which together constitute the upper end of each pole or post and which wires also readily yield to admit of the line or rope being removed from said opening when it is desired to disconnect said line or rope from the pole or post constituting my present invention.

On the annexed drawings, Figure 1 is a side elevation of my new or improved pole or post for stretching or propping clothes-lines or the like. Fig. 2 is a front elevation of the same. Fig. 3 is a plan. Fig. 4 is a side elevation of my improved pole or post with the upper wire ends shown sprung outward in the act of receiving the line or rope into the opening at the upper part thereof.

In the figures of drawings my improved pole or post is shown as consisting of a wooden portion, (marked A,) which is preferably provided with a metallic spike B at the bottom thereof for engaging with the ground. In the upper end of the wooden portion A there are inserted two stout springy wires C and C, which bend over inward and downward at their upper ends, as shown in the drawings, so that they inclose between them a curved-shaped open space D, Figs. 1 and 4, for the line or rope E to enter into, when the line or rope E and the upper wire parts C and C of the pole or post operate together in the act of placing the pole or post beneath the clothes-line or the like for the purpose or raising or elevating the line or rope with the clothes suspended thereon at a sufficient and proper height above the ground for drying the same after being washed or for other analogous purposes.

In order that the rope or line E may not slip downward through the lower part of the opening D, the portions of the wires C and C which are bent downward to form the curved opening D are at their lower parts bent horizontally in opposite directions, as shown at F and G in Figs. 1, 2, and 4, and when it is required to disconnect a pole or post from the line or rope E all that is necessary is to pull the pole or post from the line or rope E, when the pressure thus produced of the line or rope E against the upper interior part of the opening D causes the wires C C to yield outward into the position shown at Fig. 4, when the pole or post and line or rope are instantly disconnected.

Having now described the nature of my said invention and the best system, mode, or manner I am at present acquainted with for carrying the same into practical effect, I desire to observe in conclusion that what I consider to be novel and original, and therefore claim as the invention to be secured to me by Letters Patent, is as follows:

The pole or post for raising or elevating and stretching clothes-lines, whereof the upper part is constructed of two stout wire springs, whose lower ends are fastened to the upper end of the main body of the pole or post, and the upper ends of which springs are bent inward and downward, forming a curved opening between them for the line or rope to enter, the portions of the wire springs constituting the bottom of said opening being bent horizontally in opposite directions, thereby forming a closed bottom to said opening, all operating in the manner and for the purposes substantially as hereinbefore described.

In testimony whereof I, the said ST. JOHN DAY, have hereunto set my hand and seal, in the presence of two subscribing witnesses, this 23d day of July, A. D. 1901.

ST. JOHN DAY. [L. S.]

Witnesses:
HADASSAH DAY,
WILLIAM E. MURRAY.